April 11, 1961
C. D. DIPNER
2,979,418
CHEMICALLY RESISTANT COATINGS AND METHOD
FOR PREPARATION THEREOF
Filed March 3, 1958
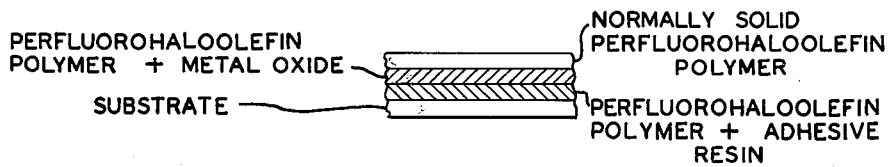
INVENTOR.
CHARLES D. DIPNER
BY
ATTORNEYS

United States Patent Office 2,979,418
Patented Apr. 11, 1961

2,979,418
CHEMICALLY RESISTANT COATINGS AND METHOD FOR PREPARATION THEREOF

Charles D. Dipner, Cranford, N.J., assignor to Minnesota Mining and Manufacturing Company, St. Paul, Minn., a corporation of Delaware Filed Mar. 3, 1958, Ser. No. 718,407

18 Claims. (Cl. 117—72)

This invention relates to a coated article and a method of applying coatings to the surface of an article. In one aspect this invention relates to chemically resistant coatings. In still another aspect the invention relates to a method of applying chemically resistant coatings to a substrate.

There is a widespread demand in industry for protective coatings which will withstand the effects of severe environmental conditions. Many protective coatings are currently available but these are useful only where high temperature and highly corrosive materials are not encountered.

Recent industrial developments have made available at high molecular weight, fluorinated olefin polymers. These fluorinated olefin polymers, for example, polymers of chlorotrifluoroethylene, have a unique combination of physical and chemical characteristics which have led to their use in a variety of applications. Physically, these polymers, some of which are flexible at low temperatures and extremely tough, possess high thermal stability and excellent electrical properties and are, therefore, widely used as electrical insulation particularly in situations where high temperatures are expected. Chemically, these polymers offer excellent resistance to highly corrosive chemicals, such as fuming nitric acid, solvents such as aniline, acetone, alkalies, such as sodium hydroxide, etc., and are therefore widely used where corrosive environment conditions are anticipated. Although some of the highly fluorinated olefin polymers, particularly polytrifluorochloroethylene, possess desirable physical and chemical characteristics, such as, in addition to those mentioned above, low permeability, zero moisture absorption, high abrasive resistance, high tensile strength, high impact strength, etc., their adhesive characteristics are poor, particularly their adhesion to metal surfaces. Therefore, it has been necessary to utilize various techniques in order to provide adhesion. For example, one method requires the use of a "mixed coat" technique, in which (1) an initial adhesive primer coat is sprayed onto the surface, air dried and baked, (2) a "mixed coat" is applied by spraying the surface with the adhesive primer, partially air drying to remove the excess solvent, then spraying thereon a dispersion of the highly fluorinated polymer, air drying and baking, and finally (3) applying multiple coats of a dispersion of the highly fluorinated polymer and baking. Such a "mixed coat" not only demands a high degree of skill in application but also necessitates twice as much time to apply as a single primer coat. Other methods include sand blasting or etching the surface, however, these techniques provide only a mechanical bonding of the polymer to the surface of the substrate, and as a result, the polymeric coating does not have a lasting adherence.

It is an object of this invention to provide an article of manufacture coated with a chemically resistant, thermally stable composition.

It is another object of this invention to prepare a strongly adherent perfluorohaloolefin polymeric coating for metal surfaces.

Still another object of this invention is to provide a method for applying a chemically resistant coating to the surface of a substrate.

An additionl object of this invention is to provide a method for applying a chemically resistant coating to the surface of a substrate without the necessity for a "mixed coat."

Another object of this invention is to provide a method for applying a chemically resistant coating which is not adversely affected by water permeability in the temperature range of 120°–212° F.

As mentioned before, some primer coatings have required that a "mixed coat" be applied prior to the application of a final coat of highly fluorinated polymers of an olefin, such as chlorotrifluoroethylene. However, when using the techniques of the present invention the final highly fluorinated polymeric coating can be applied directly over a primer coat. This development provides important chemical and economic advantages over techniques previously used. Additional advantages include the strong adhesion to the substrate and to the plastic over-coat, the absence of delamination upon aging, the flexibility, high temperature stability and chemical resistance of these primers over most of those known and used heretofore.

Various other objects and advantages will become apparent from the accompanying description and disclosure.

The invention will be further understood by reference to the accompanying drawing wherein the sole figure is a sectional view of an embodiment of the invention.

According to this invention, a first primer composition comprising an adhesive resin is applied to a substrate, then a second primer composition comprising a metal oxide, such as a metal oxide frit, of a metal above the fourth group of the periodic table having a melting point between 600° C. and 1500° C. is applied thereon. An outer coating composition comprising a highly fluorinated polymer may if desired be applied by known techniques to the coating as above prepared. Additionally, highly fluorinated polymeric materials as herein defined are usually incorporated with the adhesive resin in the first primer composition and with the metal oxide in the second primer composition. Although such highly fluorinated materials in both the primer and outer coating compositions are preferably the same highly fluorinated polymeric materials for purposes of greater compatibility, different highly fluorinated polymers or mixtures thereof may be employed. Various additives may also be introduced along with the primer and outer coating compositions of this invention, including curing agents, inert fillers, pigments, stabilizers, plasticizers, etc. To facilitate application of these compositions by known techniques, such as spraying, the various coating compositions may contain dispersing vehicles, preferably those of a volatile nature. It is highly desirable to bake the respective coatings after their application and also, preferably, to prevent "mud cracking," before a coating thickness of about 6 mils is attained. Adhesive resins preferred in the practice of this invention are epoxide resins and phenolic resins, as hereinafter defined.

In one embodiment of this invention a first primer coating composition comprising an epoxide resin, a phenolic resin, and a highly fluorinated polymer of an olefin, such as chlorotrifluoroethylene, is applied to a substrate and baked at a temperature of at least the fusion point of the fluorine-containing polymer but below that at which the resinous materials are deleteriously affected. A second primer coating composition is then applied to the baked first primer layer, which second coating composition comprises a metal oxide, which may be in frit form, of a metal above the fourth group of the periodic table, said metal having a melting point between 600° C. and 1500° C., and a fluorine-containing polymer of an olefin, then baked at a temperature between about 420° F. and about 600° F. but below that at which the resinous materials in the first primer coating are deleteriously affected. Finally one or more coatings comprising a polymer of a fluorine-containing olefin are applied, each coating being dried and baked at a temperature between about 420° F. and about 600° F. but below that at which the resinous products in the first primer coat are deleteriously affected.

The various substrates capable of being coated in accordance with this invention include, for example, a metal surface, such as surfaces of zinc, cadmium, magnesium, brass, Monel, Inconel, steel, steel alloys, aluminum, etc. and fabrics which will withstand the baking temperatures required, such as glass-fabric, asbestos-fabric, metal-fabric and the like, as well as surfaces of concrete, glass, and any plastic surface which will withstand high temperatures without degrading, for example, temperatures up to about 600° F. Examples of such plastic surfaces, which may be plane or curved, are a polyurethane surface and a silicone plastic surface.

The polymers of a fluorine-containing olefin to which the present invention is drawn are normally solid high molecular weight polymers of thermoplastic or elastomeric properties. The fluorine-containing monomers contain between 2 and 5 carbon atoms and at least one atom of a normally gaseous halogen (chlorine or fluorine) for every two carbon atoms in the olefin monomer. The preferred polymers of the present application are the polymers of perfluorohaloolefins containing between 2 and 3 carbon atoms in the olefin monomer.

Examples of the preferred perfluorohaloolefin polymers are the homopolymers of chlorotrifluoroethylene, bromotrifluoroethylene and tetrafluoroethylene; the copolymers of any combination of two of the above perfluorohalogenated olefin monomers; and the copolymers of any one of the above-mentioned perfluorohalogenated olefin monomers as well as perfluoropropene with hydrogen-containing halogenated olefins such as vinylidene fluoride, vinyl fluoride, vinylidene chloride, vinyl chloride, trifluoroethylene, chlorofluoroethylene and 1,1,3-trifluorobutadiene.

Most preferred of the above-mentioned polymers are the polymers of chlorotrifluoroethylene, namely, the homopolymer of chlorotrifluoroethylene and the copolymer of chlorotrifluoroethylene and vinylidene fluoride.

High molecular weight plastics or elastomers of the above-mentioned polymers having molecular weights above 50,000 are those which are preferably employed in this invention as distinct from low molecular weight polymers of the same monomers which exist in oil, grease and wax range. The high molecular weight polymers referred to are normally solid and have softening points above 150° C. and, in the case of homopolymers of chlorotrifluoroethylene, have no strength temperatures (NST) of at least 220° C. and preferably above 250° C. These high molecular weight polymers are employed in the coating compositions and laminates of the present invention.

For the purpose of this invention, the preferred copolymer of chlorotrifluoroethylene and vinylidene fluoride contains above about 80 mole percent and below 100 mole percent chlorotrifluoroethylene. Copolymers containing between 70 and 80 mole percent of chlorotrifluoroethylene have resinous characteristics and are soluble in a number of common organic solvents. Copolymers between 20 and 69 mole percent of chlorotrifluoroethylene are elastomeric. The selection of the proper monomer mole ratio depends on the ultimate use and desired properties. However, it has been found that for most coating compositions a chlorotrifluoroethylene polymer composition containing above 80 mole percent chlorotrifluoroethylene is desirable.

In a preferred embodiment of this invention in which the coating compositions are applied to a surface in the form of a liquid dispersion, a dispersion of polymer particles is employed wherein the particle size of the polymer is generally that of a finely divided powder, that is, at least 95 percent through a number 12 sieve, preferably a number 200 sieve in the U.S. Bureau of Standards Series. In the case of a chlorotrifluoroethylene polymer the particle size is most preferably not more than 50 microns.

Although mixtures or blends of dissimilar polymers may be employed as mentioned earlier, they must be compatible and it is generally preferred that the fluorine-containing polymer in the primer coating compositions contain the same amount or less fluorination than the polymeric coatings to be applied thereon.

Additives which improve the thermal stability of the fluorine-containing polymers, particularly the perfluorohaloolefin polymers, can also be included in the primer or final coating compositions of this invention, without departing from the scope thereof. Such additives include barium peroxide, lead dioxide, chromic oxide, chromic sulfide, cadmium oxide, zinc sulfide, molybdenum trioxide, molybdenum sulfide, stannic oxide and stannic sulfide. When added, such additives constitute between about 0.1 and about 5 parts by weight per 100 parts by weight of polymer. Inert fillers such as, for example, mica or finely divided silica can also be added to the primer compositions, in which case they constitute from 0.1 to 20 parts by weight per 100 parts by weight of polymer.

The epoxide resins usable as adhesive resin in the present invention are prepared by the condensation of epoxy compounds, such as epichlorohydrin and glycerol dichlorohydrin, with polyhydric organic compounds in the presence of sodium hydroxide to split off HCl or NaCl. Among the polyhydric compounds which can be used are alcohols, such as mannitol, sorbitol, erythritol, pentaerythritol and polyallyl alcohol; dihydric alcohols, such as glycerol or trimethyl propane; dihydric phenols, such as bisphenol, (p,p'-dihydroxy diphenyl dimethyl methane) and trihydric phenols. Becaause of their greater bond strength, higher chemical resistance, better physical properties and availability, epoxide resins prepared by the condensation of bisphenol and epichlorohydrin are preferred in the preparation of the first primer composition of this invention. In their original form, the epoxide resins are relatively low molecular weight compounds ranging from liquids to rather high melting solids depending on the degree of condensation. Thus, the epoxide resins range in properties from light mobile liquids melting at about 0° C. and having a viscosity from C to F on the Gardner-Holdt scale, up to high melting solids having a melting point of about 160–170° C. and a viscosity, as a 40 percent solution in butyl Carbitol, of about $Z_1$–$Z_5$ on the Gardner-Holdt sacle. The degree of condensation of the epoxy resins can be defined by reference to the "epoxy value" which is defined as the equivalent of epoxy groups per 100 gms. of resin. The resins used in this invention have an epoxy value between about 0.03 and about 0.65. The epoxy value of normally liquid resins ranges between about 0.3 and about 0.65 while normally solid resins range between about 0.03 and about 0.3. Another and more frequently used expression for indicating the degree of condensation of the resin is the "epoxy equivalent" which is defined as the weight of resin in gms. containing one gm. equivalent of epoxy groups. Here, the higher the equivalent the higher the degree of condensation of resin. Under this definition the resins of this invention should have an epoxy equivalent of at least 150 and should preferably not exceed about 3400. Some of these epoxide resins are commercially available as Epon, Araldite, etc.

As indicated previosuly, the epoxide resins are available as liquids or solids. In preparing the compositions of this invention, employing cross-linking or curing agents as described below, either liquid or solid epoxy resins can be employed, since on curing, very little difference is observed between compositions which are based on the liquid or the solid resins. However, because the compositions are usually heated at relatively high temperatures during baking or fusing, the use of relatively high boiling, i.e., normally solid, epoxide resins, such as Epon 1001 (a condensation product of epichlorohydrin and bisphenol A), is preferred. When cross-linking or curing agents are not employed, the normally solid epoxide resins are preferred, since better physical characteristics are obtained. When the solid epoxide resins are employed, it is preferred that they be used in the form of solutions in suitable volatile solvents, such as ketones, e.g., methyl ethyl ketone, methyl isobutyl ketone, etc.; esters, e.g., butyl Carbitol, etc.; cyclic ethers, such as tetrahydrofuran, etc. Some of the perfluorochloroolefin copolymers are also soluble in these solvents. The liquid epoxide resins are of particular value in preparing solvent-free paste compositions, cements, etc. for application by brush and dip techniques although they can also be used as solutions in the above-described solvents or in powdered form.

Also, some of the perfluorochloroolefin copolymers and the epoxide resins can be cross-linked with themselves or each other, thereby decreasing solubility, increasing chemical resistance and converting the resins from chain to space polymers, by the addition of suitable cross-linking or curing agents. Thus, where using a cross-linkable copolymer in any of the coating compositions it may be desirable to incorporate in the composition a cross-linking agent. For example, the elastomeric copolymers of trifluorochloroethylene and vinylidene fluoride are cross-linked by the addition of organic peroxides, such as benzoyl peroxide, lauryl peroxide, etc.; inorganic peroxides, such as lead, barium and zinc peroxide and basic oxides, such as magnesium oxide, zinc oxide and lead oxide; inorganic polysulfides, such as the alkali metal polysulfides and ammonium polysulfides. The above-enumerated cross-linking agents are specific to the perfluorochloroolefin copolymer. The epoxide resins are cross-linked by the addition of dialdehydes, for example glyoxal and dimercaptans which are specific to the epoxide resins. While the cross-linking of the individual components of the blend to themselves, i.e., epoxide to epoxide and copolymer to copolymer, can be effected by the use of the specific cross-linking agents without departing from the scope of this invention, such use is not preferred since the components tend to become incompatible and since the chemical and physical characteristics of the composition are not as good. On the other hand, cross-linking of the epoxide resin to the perfluorochloroolefin copolymer can be effected by incorporation of compounds, such as di-isocyanates, e.g., methylene bis-(4-phenyl-isocyanate), and amines and polyamines. In connection with the cross-linking of the epoxide resin to the copolymer, the polyamine curing agents are preferred, since they are more reactive. Additionally, the use of the polyamine cross-linking agents is preferred to the use of the specific agents enumerated above, since the ultimate composition resulting from their use has superior chemical and physical properties. For cross-linking, using any of the above-described curing agents, the concentration in the composition to be applied is maintained between about 1 and about 12 weight percent based on the weight of the material for which the curing agent is specific and preferably between about 4 and about 8 percent. In the case of polyamine curing agents, the concentration of curing agent is maintained between about 1 and about 12 weight percent of the blend and preferably between about 4 and about 8 weight percent. Representative of the preferred polyamine cross-linking agents are diethylaminopropylamine, ethylene diamine, diethylene triamine, triethylene tetramine, tetraethylene pentamine, hexamethylene diamine, piperazine, 1,5-napthaline diamine, diaminoanisole, diaminobenzoic acid diamino stilbene, diamino triphenol methane, triaminotriphenyl methane, diamino phenol, diamino benzene, triamino benzene, triamino benzoic acid, triamino phenol, 1,2-propylenediamine, 1,2,3-triamino propane, etc. Where a compound has several isomeric forms, all isomers are intended.

The phenolic resins usable in the present invention are the complete or partial condensation products of an aldehyde, such as formalydehyde, furfural, etc. with a phenol or alkylated phenol, such as butylphenol, cresol, resorcinol, etc. The use of modifying agents, such as rosin, rosin esters, polybasic acid esters and the like is also within the scope of this invention, thus to modify the phenolic condensation products, which are generally, like the epoxide resins, heat cured. Phenolic resins which are not degraded by the bake temperatures are, of course, selected. Methylon 75108, an allyl ether of trimethylol phenol, supplied by General Electric Company, is a preferred phenolic material which may be used.

It is also within the scope of this invention to use in the primer composition the respective monomers of the adhesive resins and to prepare the final condensation products in situ during the bake period.

The metal oxide or metal oxide frit contains at least one metal oxide selected from the group consisting of oxides of antimony, oxides of manganese, oxides of nickel and oxides of cobalt. The metals of these oxides are those metals which have melting points between 600° C. and about 1500° C. and are located in the fifth, seventh and eighth groups of the periodic table. This particular group of metals, above group IV of the periodic table, having a melting point between about 600° C. and about 1500° C., are selected because the oxides of these metals are formed at high temperatures and are capable of fusing with the frit at convenient temperatures and will not decompose or degrade at the temperature of fusion. According to this invention, when a metal oxide frit is employed the metal oxide constitutes between about 2 weight percent and about 85 weight percent, preferably between about 50 weight percent and about 80 weight percent, of the metal oxide frit compound. The metal oxide frit is usually prepared by incipient fusion of the metal oxide and the frit at a temperature above about 1000° C. Some metal oxide frits, for example cobaltous oxide frit, are commercially available and are supplied under that name by Harshaw Chemical Co., The Ferro Corp., and General Metallic Oxide Co., to name a few. For the purposes of this invention, a frit is defined as the calcined or partially fused, but yet unvitrified, materials of which glass is made. An example of a typical frit is a complex alkaline borosilicate glass produced by melting a mixture such as borax feldspar, quartz and cryolite. The frit can be obtained from a number of manufacturers, namely, The O. Hommell Co., Harshaw Chemical Co., J. Pemio Corp. and others.

Of the metal oxides which can be used, cobalt oxides, namely cobaltous oxide (CoO), cobaltic oxide ($Co_2O_3$), cobalto-cobaltic oxide ($Co_3O_4$), are preferred. Examples of other suitable metal oxides of this invention are manganic oxide ($Mn_2O_3$), manganous oxide (MnO), permanganate ($Mn_2O_7$), manganite or manganate ($MnO_2$), nickelous oxide (NiO), nickelic oxide ($Ni_2O_3$), nickelous-nickelic oxide ($Ni_3O_4$), nickel peroxides ($NiO_2$ and $NiO_4$), antimony trioxide ($Sb_2O_3$), antimony tetroxide ($Sb_2O_4$), and antimony pentoxide ($Sb_2O_5$). In addition, any fused combination or admixture of the aforementioned metal oxides can be used. It is within the scope of this invention, where it is desirable to fuse the outer coating of fluorine-containing polymer at a higher temperature than is generally used, i.e., at a temperature of about 600° F. or higher, to add an oxide of chromium, an oxide of molybdenum and/or molybdenum sulfide to the metal oxide primer or to the polymer itself to deter degradation of the polymer. Examples of such mixtures are the combination of molybdenum trioxide with cobaltous oxide, molybdenum sulfide with cobaltous oxide, chromic oxide with cobaltous oxide and molybdenum trioxide and chromic oxide with cobaltous oxide. These stabilizers may also be fused with a metal oxide frit or may be admixed with a metal oxide frit after it is made.

The metal oxide or metal oxide frit employed in this process is in a finely divided state or a powder which will pass through a 100 mesh screen and which will preferably pass through a 300 mesh screen in the U.S. Bureau of Standards Series. The particles are preferably dispersed in a volatile organic vehicle or dispersant before or during the time of blending with a fluorine-containing polymer, and the more finely divided the particle size of the metal oxide, the better the dispersion when a dispersion is used to lay down the primer layer.

In a first embodiment of this invention the first primer composition (A) containing between about 1 and about 99 weight percent, preferably between about 10 and about 90 weight percent of the polymer of a fluorine-containing olefin, preferably perfluorochloroolefin polymer, is mixed with and blended with the adhesive resin, as will be discussed later. The exact proportion of the polymer is based on the properties which are desired in the resulting composition, e.g., softness, bond strength, chemical resistance, flexibility, thermal stability, compatibility, etc. Thus, where maximum chemical resistance is desired, the concentration of the polymer of a fluorine-containing olefin constitutes a major proportion of the composition, that is, above about 50 weight percent, whereas where hardness and maximum bond strength is desired, the polymer constitutes a minor proportion, that is, below about 50 weight percent of the first primer composition, such as 15 weight percent. The adhesive resin content may consist totally of the epoxy condensation product, totally of the phenolic condensation product, or any mixture of one with the other. When both epoxy and phenolic condensation products are used, the preferred ratio of epoxy product to phenolic product is from about 1 : 1 to about 3 : 1. The use of epoxy resin in all first coats produces the best results.

The following examples are offered to provide a better understanding of the invention and the constituents and ratios are illustrative and should not be construed as unnecessarily limiting to the invention. The technique of application and sequence of coats, etc., are highly important in making a suitable coating, but various minor modifications may be made without departing from the scope of this invention.

EXAMPLE 1

The following composition was prepared for use in producing a first primer coating:

| Primer A-1 | Wt. Percent |
| --- | --- |
| Non-Volatiles: | |
| Homopolymer of trifluorochloroethylene (NST 300+° C.) | 61.8 |
| Epon 1001 resin (condensation product of epichlorohydrin and bisphenol A) | 24.8 |
| Methylon 75108 (allyl ether of trimethylol phenol) | 12.4 |
| 85% orthophosphoric acid | 1.0 |
| | 100.0 |
| Volatiles:[1] | |
| Xylene | 50.0 |
| Diisobutyl ketone | 12.5 |
| Methyl ethyl ketone | 25.0 |
| Isobutanol | 12.5 |
| | 100.0 |

[1] The volatile composition is approximate. Xylene and diisobutyl ketone are added in this ratio to meet viscosity requirements. Ratios of methyl ethyl ketone to isobutanol and xylene to diisobutyl ketone are true.

The volatile composition may be varied within the following limits:

| | Percent |
| --- | --- |
| Xylene | 50±10 |
| Diisobutyl ketone | 12.5±5.0 |
| Methyl ethyl ketone | 25.0±5.0 |
| Isobutanol | 12.5±5.0 |

Certain higher boiling alcohols, e.g., butanol, pentanol-1 and 2-methylbutanol-4 may replace isobutanol as solvent for the phenolic material.

The above first primer coat was prepared by charging 25 parts by weight of a dispersion of homopolymer of chlorotrifluoroethylene (NST 300+° C.) in 80/20 xylene-diisobutyl ketone thinner, concentrated to 40% solids, to a mixing kettle. Five (5) parts by weight of Methylon 75108 prepared as a 40% (wt.) solution in isobutanol, was added and the mixture stirred until homogeneous. Ten (10) parts of Epon 1001 resin, prepared as a 40% solution (wt.) in methyl ethyl ketone, was added to the mixing kettle, the contents of which were then stirred again. After the mixture was homogeneous, approximately 1.0% by weight of 85% orthophosphoric acid (based on resin solids) was added to counteract the effect of any corrosion inhibitors, such as inorganic nitrites, that may have been applied to the prepared substrate. The mixture was stirred thoroughly. Final viscosity was 34±3 seconds Zahn G-1 cup at 75° F. Final solids content was 40 weight percent.

EXAMPLE 2

The following composition was also prepared for use in producing a first primer coating:

| Primer A-2 | Wt. Percent |
| --- | --- |
| Non-volatile composition: | |
| Homopolymer of trifluorochloroethylene (NST 300+° C.) | 59.4 |
| Copolymer of chlorotrifluoroethylene and vinylidene fluoride | [1] 3.1 |
| Epon 1001 resin (condensation product of epichlorohydrin and bisphenol A) | 25.0 |
| Methylon 75108 (allyl ether of trimethylol phenol) | 12.5 |
| | 100.0 |
| Volatile composition: | |
| Amyl acetate | 62.5 |
| Methyl ethyl ketone | 25.0 |
| Isobutanol | 12.5 |
| | 100.0 |

[1] For a lower elastomer content the homopolymer is increased accordingly.

Preparation of the above primer is similar to that of the primer of Example 1 with the exception that a homopolymer of chlorotrifluoroethylene and a copolymer of 50 mole percent chlorotrifluoroethylene and 50 mole percent vinylidene fluoride in amyl acetate are substituted for the homopolymer of chlorotrifluoroethylene alone. Final solids are adjusted to 40% by weight.

Again, as with the primer of Example 1, selected higher alcohols may be substituted for the isobutanol.

The volatile composition may be varied within the following limits:

| | Percent |
|---|---|
| Amyl acetate | 62.5±20.0 |
| Methyl ethyl ketone | 25.0±5.0 |
| Isobutanol | 12.5±10.0 |

In preparing the second primer composition (B) of the first embodiment, between about 5 parts by weight and about 60 parts by weight, preferably between about 20 parts by weight and about 50 parts by weight, of the metal oxide are blended with each 100 parts by weight of fluorine-containing polymer. The polymer to metal oxide ratio most preferably employed is between about 3 : 0.5 and about 3 : 2. Generally, where maximum chemical resistance is required, the metal oxide constitutes a minor proportion of the composition, whereas where maximum bond strength is required, the metal oxide constitutes a proportion of the composition approaching 50 percent by weight or more.

EXAMPLE 3

The following composition was prepared as a second primer:

| Primer B-1 | Wt. Percent | Grams |
|---|---|---|
| Non-volatile: | | |
| Homopolymer of chlorotrifluoroethylene (NST 316° C.) | 25.8 | 713 |
| Cobalt Oxide Frit obtained from Harshaw Chemical Co. | 13.0 | 359 |
| Copolymer of chlorotrifluoroethylene 50 mol percent and vinylidene fluoride 50 mol percent | 1.2 | 32 |
| Volatile vehicle: | | |
| Amyl acetate | 60.0 | 1,657 |
| | 100.0 | |

The above primer was prepared by mixing 3240 grams of polychlorotrifluoroethylene dispersion (30% by weight of polychlorotrifluoroethylene dispersed in amyl acetate) and 486 grams of cobalt oxide frit in a pebble mill for 4 hours. After milling, 81 grams of amyl acetate were decanted to adjust solids to 40% and 2679 grams of this primer were used to prepare a dip coated primer. Amyl acetate (186 grams) was decanted and copolymer solution, 286 grams (12.2% by weight of copolymer in amyl acetate) was added.

EXAMPLE 4

The following composition was prepared as a second primer:

| Primer B-2 | Wt. Percent | Grams |
|---|---|---|
| Non-volatile: | | |
| Homopolymer of chlorotrifluoroethylene (NST 310° C.) | 23.9 | 860 |
| Cobalt Oxide Frit obtained from Harshaw Chemical Co. | 8.1 | 288 |
| Volatile: | | |
| Chlorotrifluoroethylene 10-200 Wax Plasticizer (20± non-volatile—18 hours at 480° F.) | 8.0 | 290 |
| Xylene | 36.0 | 1,297 |
| Diisobutyl ketone | 24.0 | 865 |
| | 100.0 | |

The above primer coat was prepared by mixing 2880 grams of polychlorotrifluoroethylene dispersion (40% by weight of polychlorotrifluoroethylene dispersed in a 50-50 mixture of xylene and diisobutyl ketone) with 288 grams of cobalt oxide frit in a pebble mill. After milling for four hours, 432 grams of xylene were added to readjust the solids to 40%.

EXAMPLE 5

The following composition was prepared as a second primer:

| Primer B-3 | Wt. Percent |
|---|---|
| Non-volatile: | |
| Homopolymer of trifluorochloroethylene, 1.25-1.33 sol. vis. (NST 300° C.) | 60.0 |
| Low molecular weight polytrifluorochloroethylene wax (telomer residue), M.P. 200° C. | 15.0 |
| Cobalt Oxide (73.5± cobalt, Co₃O₄) | 25.0 |
| | 100.0 |
| Volatile: | |
| Xylene | 50.0 |
| Diisobutyl ketone | 50.0 |
| | 100.0 |

The above second primer composition was prepared by the method described in Example 4. The final solids content was adjusted to 40 weight percent, and the viscosity was 34±3 seconds Zahn G-1 cup at 75° F.

Table 1

| | Example 6 | Example 7 | Example 8 | Example 9 |
|---|---|---|---|---|
| Dispersion [1] in grams of polychlorotrifluoroethylene and copolymer of chlorotrifluoroethylene and vinylidene fluoride (as in Primer A-2) in amyl acetate | 100 | | | |
| 40 weight percent polychlorotrifluoroethylene in xylene and diisobutyl ketone (Zahn G-1 cup=32-34 sec.), Grams | 100 | 200 | 200 | 200 |
| Xylene, Grams | 10 | 12.5 | 12.5 | 12.5 |
| Mica, Grams | 3 | 3 | 3 | 3 |
| Cobalt Oxide Frit, Grams | 3 | 1.5 | 1.5 | 1.5 |
| MoO₃, Grams | | | 0.5 | |
| Cr₂O₃, Grams | 0.5 | 0.5 | | |
| MoS₂, Grams | | | | 0.5 |
| Percent Solids | 35.3 | 39 | 39 | 39 |
| Temperature of Fusion, °F. | 560 | 560 | 560 | 560 |

[1] 30 percent by weight of polychlorotrifluoroethylene; Brookfield viscosity about 10,000 centipoises.

The primer composition of this invention may be applied by techniques which employ a volatile dispersion vehicle as above. However, it is within the scope of this invention, particularly where the more soluble elastomeric polymers are used, to prepare a solution of the polymer. It is also within the scope of this invention to apply the primer compositions as a powdered mixture of the essential ingredients, which may then be fused in situ. For application by spraying techniques the dispersing vehicles are preferably added to produce a final solids content of about 40 weight percent. Examples of the volatile dispersing vehicles which may be suitably used in this invention include those of Examples 1-9, such as the aromatic hydrocarbons, for example, benzene, toluene, xylene, etc.; aromatic and aliphatic ketones, such as, for example, methyl ethyl ketone, diisobutyl ketone, diphenyl ketone, etc.; aliphatic esters, such as amyl acetate, ethyl actate, ethyl propionate, and water used in combination with any soluble wetting agent, such as, for example, acetone, butanol, pentanol, etc.

The primer compositions of this invention can also contain various additives which are included to alter or improve some of the physical characteristics without departing from the scope of this invention. For example, plasticizers can be added. Suitable plasticizers include the low molecular weight perfluorochloroolefin polymers, such as the polymers of and sulfuryl chloride telomers of chlorotrifluoroethylene. The low molecular weight homopolymer of chlorotrifluoroethylene ranges from relatively mobile liquids to waxes. One of the preferred low molecular weight telomers of chlorotrifluoroethylene is the homotelomer which has the general formula $$Cl(CF_2CFCl)_nCl$$

in which $n$ varies from about 4 to about 20. These plasticizers are soluble in the volatile dispersing vehicle and when used they are added in an amount between about 1 and about 40 parts by weight per 100 parts by weight of the fluorine-containing polymer. Although the addition of plasticizers is preferred since it results in more flexible coatings having smooth glossy surfaces, it is not an essential ingredient in the primer coating compositions.

After the primer coating compositions have been prepared and thoroughly mixed, they may be applied to a surface by using a spray, dip, knife or flow coating technique depending upon the viscosity of the dispersion, solution or slurry. As mentioned above, they may also be applied as a powdered mixture. After the first primer composition of this first embodiment has been applied to a substrate by any of the above techniques, it is fused into a continuous adherent film by heating. Fusion temperatures range between about 420° F. and about 600° F., preferably between about 450° F. and about 560° F., for example, 500° F. to 520° F., and are applied for a period of from about a few seconds to about 2 hours, preferably for a period not in excess of about 1 hour. In cases where the primer composition contains a plastic perfluorohaloolefin polymer and no plasticizer, the fusion is effected by heating the primer composition at a temperature above the first order transition temperature of the polymer which is about 215° C. in the case of polychlorotrifluoroethylene plastic. Generally, the higher the fusion temperature, the shorter the residence period of the primer coating composition at that temperature. The residence period is also determined by the method employed for heating. For example, the substrate may be placed in an oven and baked for a period of hours. The subsequent application of the second primer coat may be laid down in the manner stated above allowing the layer to air dry and then fusing as before. The primer coating composition may also be used as a final coating, and when such a primer coating composition is so used, layers of the primer coating composition can be laid down up to thicknesses about 25 mils or higher, although coatings of more than about 10 mils generally are not required or desirable. When the primer coating composition is employed as an intermediate coating layer, thicknesses of not more than about 6 mils are employed, since at higher thicknesses there is a tendency for the coating to "mud crack." It is further within the scope of the present invention to apply successively one or more coats of each composition. In the first embodiment or when multiple coats of primer composition are applied, baking and fusing of each primer coat after application of not more than 2 mils is preferred, although successive coats of primer may be applied and fused simultaneously.

A final coating or coatings of a polymer of fluorine-containing olefins, such as a dispersion of polychlorotrifluoroethylene, NST. 310° C., may then be applied to the baked primer coat. When using multiple coats of such polymer, it is desirable to bake and fuse each coat before a further coat is applied. The final coating or coatings are baked and cured at a temperature between about 420° F. and about 600° F., preferably at a temperature between about 450° F. and about 500° F., depending on the amount of plasticizer present, for a period of from about 2 hours to about 25 hours, preferably for a period not exceeding 12 hours. After the final bake, it is also desirable to quench the coated article within 1 minute after removal from the oven to at least 300° F., thereby assuring an amorphous film which will withstand stresses of normal usage. Failure to quench can result in a crystalline film subject to stress cracking and generally results in a shorter service life. If enhanced release properties are desired, as in molding applications, polytetrafluoroethylene may be sprayed onto the final coating before or during the final bake.

When fusing or curing the primer coatings, the adhesion to a surface may be enhanced by applying pressure to the coated surface.

An application technique illustrative of this first embodiment of this invention is as follows:

EXAMPLE 10

Procedure:

(1) Degrees or prebake at 650° F. to 700° F. for one hour (substrate temperature).
(2) Abrasive blast and clean.
(3) Coat and bake as follows:

| Coat No. | Material | Baking Schedule | | Baked Film Thicknesses, mils |
|---|---|---|---|---|
| | | Substrate Temperature, °F. | Hours | |
| 1 | Primer A-1 (Example 1) | 500 | 0.75 | 2 |
| 2 | Primer B-3 (Example 5) | 500 | 0.75 | 2 |
| 3, 4, 5, 6 | Dispersion of 40 Wt. percent polychlorotrifluoroethylene (NST 310+° C.) in xylene and diisobutyl ketone | 500 | 0.75 (each coat) | 2 (each coat) |
| 7 | Dispersion of 40 wt. percent polychlorotrifluoroethylene (NST 310+° C.) in xylene and diisobutyl ketone. | 500 | 6.5 | 2 |
| Totals | | | 11.0 | 14 |

(Baking schedule does not include time required to heat substrate to 500° F. Heat up time will vary with size and mass of object).

(4) Quench rapidly at end of final bake.
(5) Test electrically for porosity.
(6) Patch, where and if necessary.

As a second embodiment of this invention it may be desirable for some purposes to employ a single primer composition containing all the ingredients in one composition, i.e., the metal oxide, adhesive resin (either phenolic or epoxide resin alone or both resins), and the polymer of fluorine-containing olefin, either with or without further additives and/or organic dispersing vehicles, without departing from the scope of this invention. Those single combined primer compositions may be used which contain the following amounts of the essential ingredients, based on 100 parts by weight of polymer:

| | Range, parts | Preferable range, parts |
|---|---|---|
| Polymer of fluorine-containing olefin | 100 | 100 |
| Adhesive resin | 1–99 | 10–90 |
| Metal oxide | 5–60 | 20–50 |

The exact proportion of the polymer selected, within the above ranges, is determined by the properties desired in the final coating, e.g., softness, bond strength, chemical resistance, flexibility, thermal stability, etc. The same application techniques as described earlier can, of course, be followed.

For general corrosion service the critical thicknesses of the respective coats are generally as follows:

*Table II*

(1) First primer: 2.0 to 2.5 mils (2 mils min.)
(2) Second primer: 2.0 to 2.5 mils (2 mils min.)
(3) Outer coating: 10 mils (10 mils min.)

The method of coating an article and the coated article itself, herein described, is particularly recommended for application involving exposure to solutions above 10% of acids, bases or salts at temperatures ranging to 300° F. Although each of the primer compositions of the two primer system may be used alone without the other, it has been discovered that the use of both primer compositions, preferably applied successively in the manner described, surprisingly produces a firmly bonded coating possessing properties superior to those displayed by each of the respective primers used alone. In corrosion adhesion in the presence of certain chemicals, particularly throughout the temperature range of 120° F. to 200° F., a marked and quite surprising improvement in the resultant coated article is obtained. Water permeability and the adverse effect of water on systems using only the second primer composition of the two primer system introduces a serious adhesion problem with dilute acid and alkali solutions within the 120° F.–200° F. temperature range. Following the techniques of the instant invention no such adhesion problem occurs. Furthermore, the present invention eliminates all necessity for a "mixed coat," such as is required if the first primer composition of the two primer system is used alone, and produces a coating much less affected by organic chemicals than that in which the first primer composition only is employed.

The finished coating of this invention, prepared by the methods hereinbefore described, is strongly adherent to the substrate and cannot be peeled, chipped or cracked. Corrosion adhesion test results, obtained using a modified Batelle corrosion test cell, indicate that the method for coating articles in accordance with this invention and the resulting coated articles are satisfactory for service in the following environments:

*Table III*

INORGANIC CHEMICALS—WATER, ACIDS AND ALKALIES

| Chemical | Concentration, Percent | Temperature Range, °F. |
|---|---|---|
| Water | | 77–212 |
| Chromic acid | <1–50 | 77–220 |
|  | 51–60 | 77–240 |
| Hydrochloric acid | <1–5 | 77–220 |
|  | 27–38 | 77–180 |
| Nitric acid | <1–20 | 77–220 |
|  | 70 | unsatis. at 180 |
| Phosphoric acid | <1–59 | 77–220 |
|  | 60–85 | 77–240 |
| Sulfuric acid | <1–44 | 77–220 |
|  | 45–98 | 77–240 |
| Sodium hydroxide | <1–50 | 77–220 |

*Table IV*

INORGANIC CHEMICALS—ACID CHLORIDES AND ACID SALTS

| Chemical | Concentration, Percent | Temperature Range, °F. |
|---|---|---|
| Aluminum chloride | <1–50 | 77–220 |
| Ammonium chloride | <1–50 | 77–220 |
| Chlorosulfonic acid | 100 | 77–220 |
| Cupric chloride | <1–50 | 77–220 |
| Ferric chloride | <1–75 | 77–220 |
| Phosphorous oxychloride | <100 | 77–120 |
| Titanium tetrachloride | <100 | 77–180 |
| Sodium dichromate | <1–50 | 77–220 |

*Table V*

ORGANIC CHEMICALS

| Chemical | Concentration, Percent | Temperature Range, °F. |
|---|---|---|
| Acids: | | |
| Acetic acid | <1–10 | 77–220 |
|  | 100 | 77–170 |
| Monochloroacetic acid | <1–10 | 77–220 |
| Oxalic acid | 50 | 77–210 |
| Citric acid | 50 | 77–220 |
| Acid Anhydrides: Acetic anhydride | 100 | 77–220 |
| Amides: Urea | 50 | failed at 220 |
| Hydrocarbons: Toluene | 100 | 77–170 |

*Table VI*

| Mixed Chemicals | Concentration, Percent | Temperature, °F. |
|---|---|---|
| Inorganic Acids: | | |
| Sulfuric acid | 52 | |
| Nitric acid | 28 | failed at 190. |
| Zinc oxide | 7 | |
| Water | 13 | |
| Inorganic and Organic Acids: | | |
| Sulfuric acid | 79 | |
| Oxalic acid | 10 | 77–200. |
| Water | 11 | |
| Hydrochloric acid | 30 | |
| Sulfuric acid | 2 | 77–175. |
| Acetic acid | 1 | |
| Water | 67 | |
| Inorganic Acids and Acid Chlorides: | | |
| Hydrochloric Acid | 13.6 | |
| Cupric chloride | 1.8 | 77–200. |
| Water | 84.6 | |
| Hydrochloric acid | 16.8 | |
| Ferric chloride | 21.8 | unsatis. at 190. |
| Water | 61.4 | |

This invention relates to a coated article and a method of applying coatings to the surface of an article. According to this invention, a first primer composition comprising a polymer of a fluorine containing olefin and at least one adhesive resin selected from the group consisting of epoxy and phenolic resins is applied to a substrate, then a second primer composition comprising a polymer of a fluorine containing olefin and a metal oxide, of a metal above the fourth group of the periodic table, said metal having a melting point between 600° C. and 1500° C., is applied thereon. An outer coating composition comprising a highly fluorinated polymer may be applied to the coating above described. Generally it is preferable to bake the respective coatings after their application, as herein described.

The method for preparing the coated article of this invention may be any of the methods or any of the various modifications of the procedure herein described, and various other modifications may become apparent to those skilled in the art without departing from the scope of this invention.

I claim:
1. A process which comprises applying successively to a substrate a first, metal oxide free, coating composition comprising a polymer of a fluorine-containing olefin having between 2 and 5 carbon atoms and having at least one atom of a normally gaseous halogen for every two carbon atoms of said olefin, and at least one adhesive resin selected from the group consisting of epoxide resin and phenolic resin, the adhesive resin-to-polymer ratio ranging from about 10 : 90 to about 90 : 10, and a second coating composition being free of said adhesive resin and comprising a metal oxide of a metal above the fourth group of the periodic table, said metal having a melting point between 600° C. and 1500° C., and a polymer of a fluorine-containing olefin, the metal oxide-to-polymer ratio ranging from about 5 : 100 to about 60 : 100, and finally heating said coatings to a temperature between about 420° F. and about 600° F. to provide a fused adherent coating on the surface of the substrate.

2. The process of claim 1 in which the polymer of a perfluorohaloolefin is a homopolymer of tetrafluoroethylene.

3. The process of claim 1 in which the polymer of a perfluorohaloolefin is a homopolymer of chlorotrifluoroethylene.

4. The process of claim 1 in which the polymer of a perfluorohaloolefin is a copolymer of chlorotrifluoroethylene and vinylidene fluoride.

5. The process of claim 1 in which the polymer of a perfluorohaloolefin is a copolymer of perfluoropropene and vinylidene fluorine.

6. A process which comprises applying successively to a substrate a first, metal oxide free, coating composition comprising a polymer of a perfluorohaloolefin and at least one adhesive resin selected from the group consisting of epoxide resin and phenolic resin, the adhesive resin-to-polymer ratio ranging from about 10 : 90 to about 90 : 10, and a second coating composition being free of said adhesive resin and comprising a metal oxide of a metal above the fourth group of the periodic table, said metal having a melting point between 600° C. and 1500° C., and a polymer of a perfluorohaloolefin, the metal oxide-to-polymer ratio ranging from about 5 : 100 to about 60 : 100, then heating said coatings to a temperature between about 420° F. and about 600° F. to provide a fused adherent coating on the surface of the substrate.

7. A process which comprises applying to a substrate a first, metal oxide free, coating composition comprising a polymer of a perfluorohaloolefin and at least one adhesive resin selected from the group consisting of epoxide resin and phenolic resin, the adhesive resin-to-polymer ratio ranging from about 10 : 90 to about 90 : 10; heating to a temperature between 420° F. and 600° F.; applying thereon a second coating composition being free of said adhesive resin and comprising a metal oxide of a metal above the fourth group of the periodic table, said metal having a melting point between 600° C. and 1500° C., and a polymer of a perfluorohaloolefin, the metal oxide-to-polymer ratio ranging from about 5 : 100 to about 60 : 100; and heating to a temperature between about 420° F. and about 600° F. to provide a fused adherent coating on the surface of the substrate.

8. A process which comprises applying to a substrate a first, metal oxide free, coating composition comprising a polymer of a perfluorohaloolefin and at least one adhesive resin selected from the group consisting of epoxide resin and phenolic resin, the adhesive resin-to-polymer ratio ranging from about 10 : 90 to about 90 : 10; heating to a temperature between 420° F. and 600° F.; applying thereon a second coating composition being free of said adhesive resin and comprising a metal oxide of a metal above the fourth group of the periodic table, said metal having a melting point between 600° C. and 1500° C., and a polymer of a perfluorohaloolefin, the metal oxide-to-polymer ratio ranging from about 5 : 100 to about 60 : 100; heating to a temperature between about 420° F. and about 600° F.; applying thereon a coating of a normally solid perfluorohaloolefin polymer having a molecular weight above 50,000, and baking the entire coating at a temperature between about 420° F. and about 600° F. to provide a fused adherent coating on the surface of the substrate.

9. The process of claim 8 in which the perfluorohaloolefin is chlorotrifluoroethylene.

10. The process of claim 9 in which the metal oxide is cobalt oxide.

11. The process of claim 9 in which the metal oxide is cobalt oxide frit.

12. An article of manufacture which comprises a substrate; a first, metal oxide free, primer coating fused thereon comprising a perfluorohaloolefin polymer and at least one adhesive resin selected from the group consisting of epoxide resin and phenolic resin, the adhesive resin-to-polymer ratio ranging from about 10 : 90 to about 90 : 10; a second primer coating fused to said first primer coating, said second primer coating being free of said adhesive resin and comprising a perfluorohaloolefin polymer and a metal oxide of a metal above the fourth group of the periodic table, said metal having a melting point between 600° C. and 1500° C., the metal oxide-to-polymer ratio ranging from about 5 : 100 to about 60 : 100; and an outer protective coating fused to said second primer coating, said outer coating comprising a normally solid perfluorohaloolefin polymer.

13. The article of claim 12 in which the metal oxide is cobalt oxide.

14. The article of claim 13 in which the perfluorohaloolefin polymer is a homopolymer of chlorotrifluoroethylene.

15. The article of claim 13 in which the perfluorohaloolefin polymer is a copolymer of chlorotrifluoroethylene and vinylidene fluoride.

16. The article of claim 13 in which the perfluorohaloolefin polymer is a copolymer of perfluoropropene and vinylidene fluoride.

17. A process which comprises applying to a substrate a first, metal oxide free, coating composition, comprising a polymer of a perfluorohaloolefin, a phenolic resin, and an epoxide resin, the ratio of the latter two resins to perfluorohaloolefin ranging from about 10 : 90 to about 90 : 10 and the ratio of epoxide resin to phenolic resin ranging from about 1 : 1 to about 3 : 1; heating to a temperature between about 420° F. and 600° F.; applying thereon a second coating composition consisting essentially of a metal oxide of a metal above the fourth group of the periodic table, said metal having a melting point between 600° C. and 1500° C., and a polymer of a perfluorohaloolefin, the metal oxide to polymer ratio ranging from about 5 : 100 to about 60 : 100; and heating to a temperature between about 420° F. and 600° F. to provide a fused adherent coating on the surface of the substrate.

18. A process which comprises spraying onto a substrate a first, metal oxide free, coating composition comprising a polymer of a perfluorohaloolefin, a phenolic resin; and an epoxide resin, the ratio of the latter two resins to perfluorohaloolefin ranging from about 10 : 90 to about 90 : 10 and the ratio of epoxide resin to phoenolic resin ranging from about 1 : 1 to about 3 : 1; heating said coated substrate to a temperature between about 420° F. and 600° F.; spraying thereon a second coating composition consisting essentially of a metal oxide of a metal above the fourth group of the periodic table, said metal having a melting point between 600° C. and 1500° C., and a polymer of a perfluorohaloolefin, the metal oxide to polymer ratio ranging from about 5 : 100 to about 60 : 100; heating said coated substrate to a temperature between about 420° F. and 600° F.; spraying thereon a coating consisting essentially of a normally solid perfluorohaloolefin polymer having a molecular weight above about 50,000; and baking the coated substrate at a temperature between about 420° F. and 600° F. to provide a fused adherent coating on the surface of the substrate.

References Cited in the file of this patent

UNITED STATES PATENTS

| | | |
|---|---|---|
| 2,478,322 | Robinson et al. | Aug. 9, 1949 |
| 2,495,630 | Dorst | Jan. 24, 1950 |
| 2,567,162 | Sanders | Sept. 4, 1951 |
| 2,707,157 | Stanton et al. | Apr. 26, 1955 |
| 2,707,703 | Dorst | May 3, 1955 |
| 2,825,706 | Sanders | Mar. 4, 1958 |